United States Patent [19]
Ebisawa

[11] Patent Number: 5,886,731
[45] Date of Patent: Mar. 23, 1999

[54] VIDEO DATA RECEIVING APPARATUS, VIDEO DATA TRANSMITTING APPARATUS, AND BROADCASTING SYSTEM

[75] Inventor: Kan Ebisawa, Kanagawa, Japan

[73] Assignee: Sony Corporation, Tokyo, Japan

[21] Appl. No.: 736,603

[22] Filed: Oct. 25, 1996

[30] Foreign Application Priority Data

Oct. 30, 1995 [JP] Japan .................................. 7-282144

[51] Int. Cl.⁶ ......................... H04N 5/262; H04N 5/265
[52] U.S. Cl. ............................................. 348/9; 348/563
[58] Field of Search .................................. 348/563, 8, 9, 348/10; H04N 7/10

[56] References Cited

U.S. PATENT DOCUMENTS

| | | | |
|---|---|---|---|
| 5,155,591 | 10/1992 | Wachob | 348/9 |
| 5,515,098 | 5/1996 | Carles | 348/8 |
| 5,600,366 | 2/1997 | Schulman | 348/9 |
| 5,652,615 | 7/1997 | Bryant | 348/9 |

FOREIGN PATENT DOCUMENTS

| | | |
|---|---|---|
| 0 355 697 A | 2/1990 | European Pat. Off. . |
| 0 536 628 A | 4/1993 | European Pat. Off. . |
| 0 656 718 A | 6/1995 | European Pat. Off. . |
| WO 90/03706 | 4/1990 | WIPO . |

*Primary Examiner*—Howard Britton
*Attorney, Agent, or Firm*—Frommer Lawrence & Haug, LLP.; William S. Frommer

[57] ABSTRACT

A video data receiving apparatus displays the program video inserted the CM vide with the desired timing and the desired from based on the demand of viewers. Further, a video data transmitting apparatus transmits the CM data and the program data to display the program video being inserted the CM video with desired form on the receiving apparatus. Still further, a broadcasting system wherein the program video inserted the CM video with the form based on the demand of the viewer are displayed on the receiving side is disclosed.

24 Claims, 11 Drawing Sheets

| CM1<br>1 frame 1 field<br>24-43 line | CM1<br>1 frame 1 field<br>44-63 line | CM1<br>1 frame 1 field<br>64-83 line | CM1<br>1 frame 1 field<br>84-103 line | CM1<br>1 frame 1 field<br>104-123 line | CM1<br>1 frame 1 field<br>124-143 line |
|---|---|---|---|---|---|
| 1 frame 1 field | 1 frame 2 field | 2 frame 1 field | 2 frame 2 field | 3 frame 1 field | |

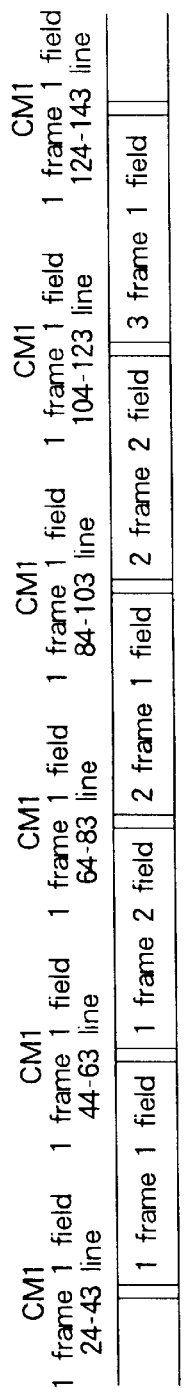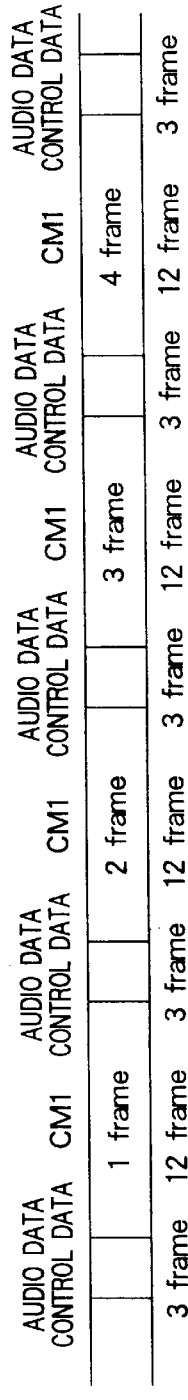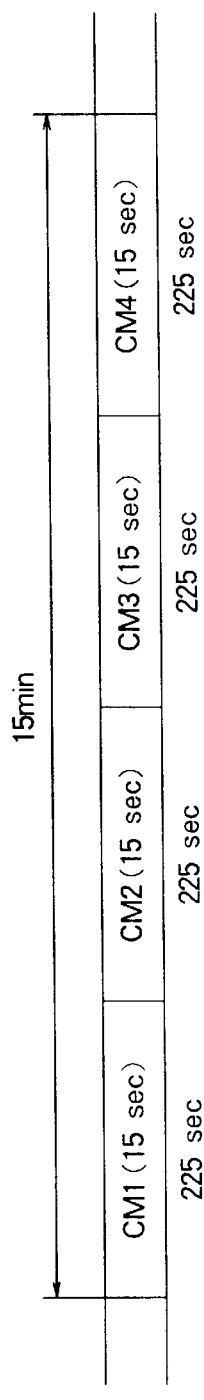
FIG. 7A
FIG. 7B
FIG. 7C

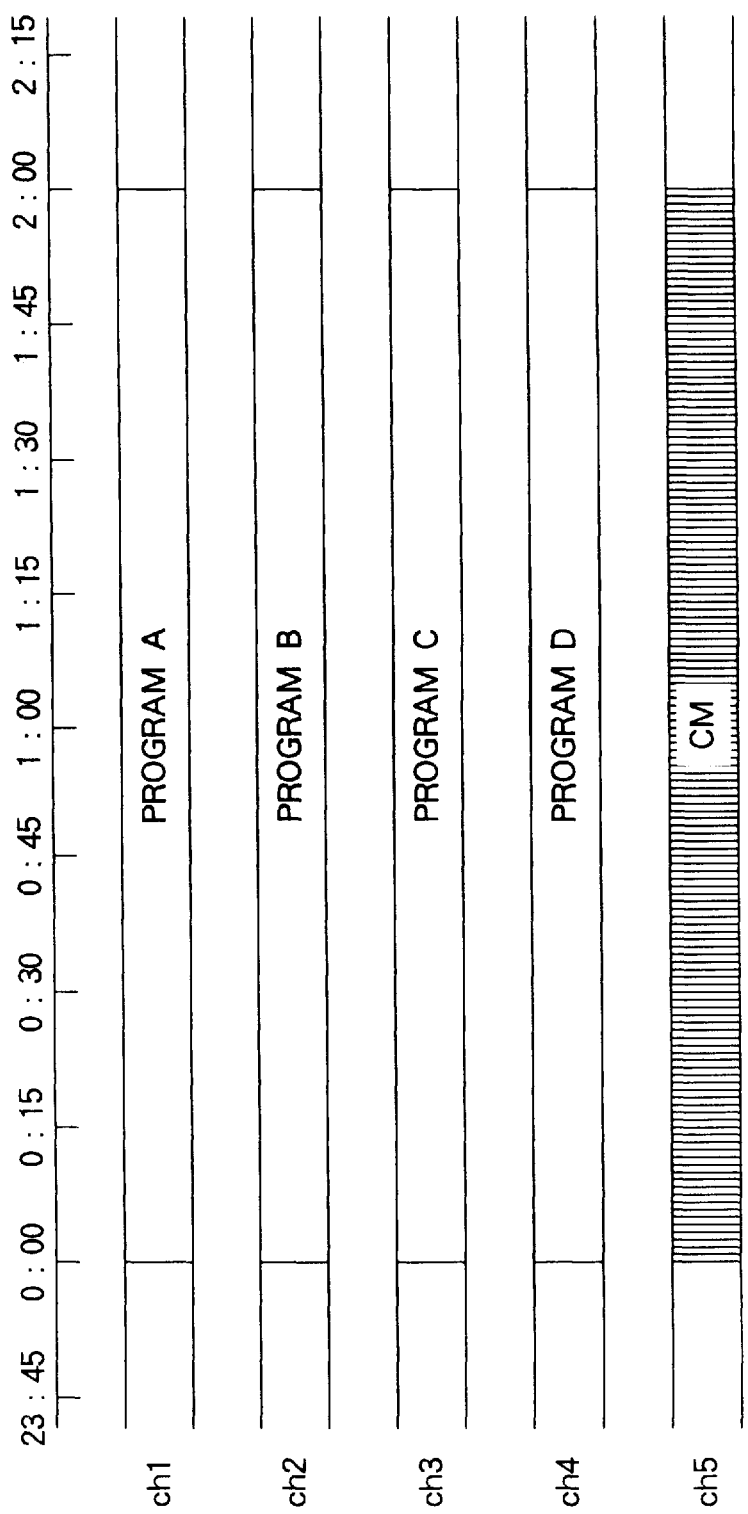

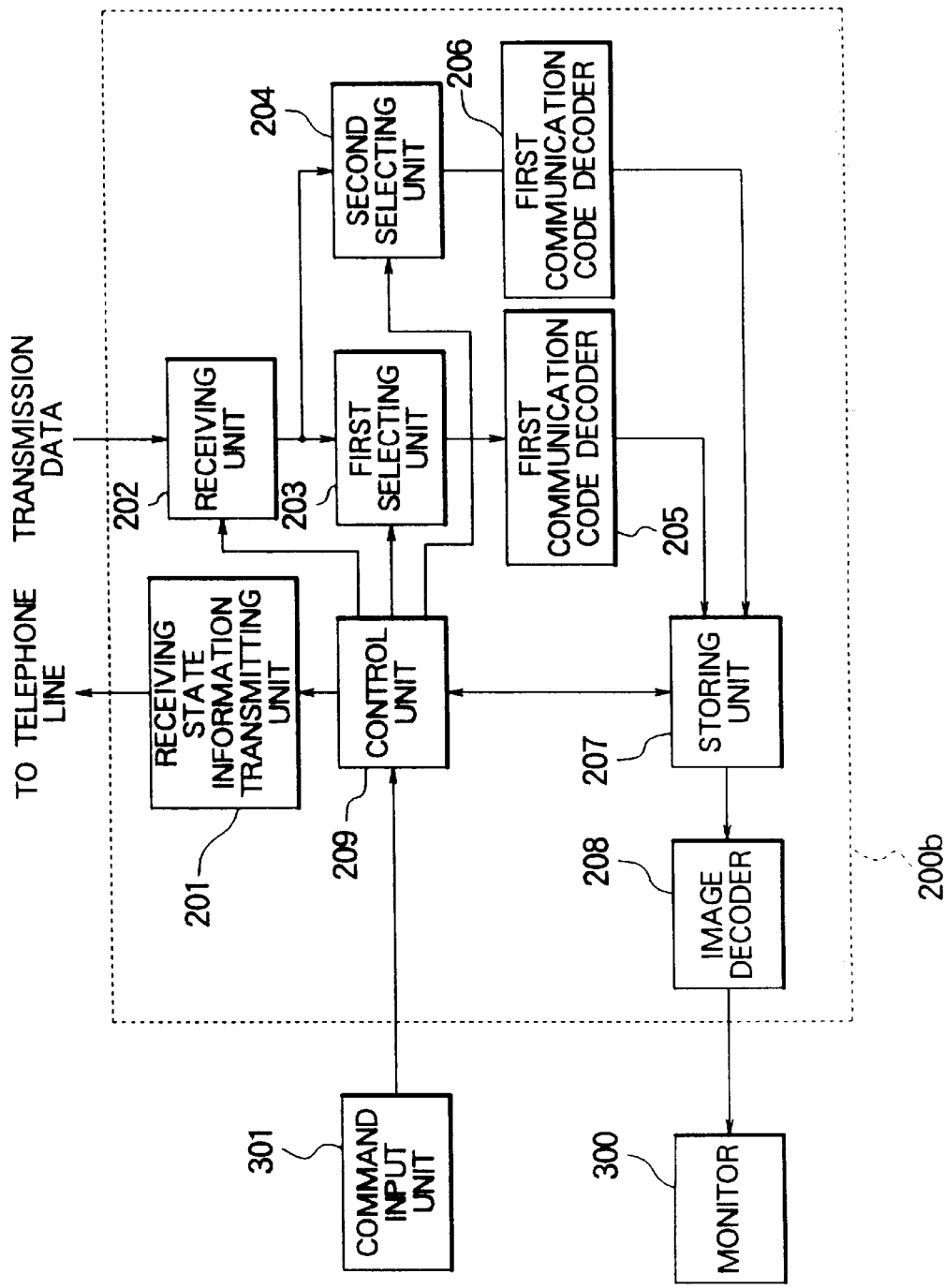

VIDEO DATA RECEIVING APPARATUS, VIDEO DATA TRANSMITTING APPARATUS, AND BROADCASTING SYSTEM

BACKGROUND OF THE INVENTION

1. Field of the Invention

The present invention relates to a video data receiving apparatus receiving video data, a video data transmitting apparatus transmitting video data broadcasting system distributing video data.

2. Description of the Related Art

In current broadcasting systems, two types of broadcasts are known.

One is the system in which the viewer does not have to pay for viewing the programs since commercial advertisements (hereinafter referred to as commercials or CMs) are inserted during the broadcast. The programs provided by private broadcasting stations for usual television broadcast are broadcasted by this system.

The other one is the system in which the viewer must pay for every program or for every predetermined period (every month or the like) in place of insertion of commercials during the program. The television broadcasts by Japan's NHK, satellite broadcasts, broadcast by cable TV, etc. are included in this system.

In such current broadcasting systems, the type of the broadcasting system is determined by the broadcasting station and is not determined by the program content.

In practice, however, programs in which real time and instantaneousness are sought, for example, sports broadcasts, it is not desirable for the programs to be interrupted by CMs. There are viewers who would like to view the entire period even if having to pay a fee. Further, conversely, it is easy to imagine that there are viewers who, depending on the content of the program, would not mind watching it with CMs inserted, so would like to watch it free.

In broadcasting systems heretofore, however, these desires of the viewers, for example, the desire to view a program continuously without CMs even if having to pay or the desire to view a program for free since CMs can be inserted, have never been reflected at all.

SUMMARY OF THE INVENTION

A object of the present invention is to provide a video data receiving apparatus which displays a program with appropriate insertion of CMs in a form in accordance with the desires of the viewer.

Another object of the present invention is to provide a video data transmitting apparatus which transmits CM data and program data so that a receiving apparatus displays a program with appropriate insertion of CMs in a form in accordance with the desires of the viewer.

Still another object of the present invention is to provide a broadcasting system with which a viewer can view a program with appropriate insertion of CMs in a form in accordance with the desires of the viewer.

To achieve the object of the present invention, a video data receiving apparatus of the present invention comprises a video data receiving apparatus, comprising a receiving means for receiving program data to display program video and commercial data to display commercial video, an input means for inputting insertion condition data instructing insertion timing and/or insertion quantity of the commercial data inserted into the program data, a display means for displaying the program video and/or the commercial video, and an insertion means for inserting the commercial data into the program data based on the insertion condition data instructing the insertion timing and/or the insertion quantity inputted by the input means and providing the data to the display means.

Also, to achieve another object of the present invention, a video data transmitting apparatus of the present invention comprises a video data transmitting apparatus, comprising a multiplexing means for multiplexing program data to display program video and commercial data to display commercial video in a manner so that they can be demultiplexed and so that the commercial data can be inserted into the program data based on insertion condition information instructing insertion timing and/or insertion quantity at receiving side, a transmitting means for transmitting the program data and the commercial data multiplexed by the multiplexing means to the receiving side, a receiving means for receiving data indicating the insertion condition information transmitted from the receiving side.

Also, to achieve another object of the present invention, a video data transmitting apparatus of the present invention comprises a video data transmitting apparatus, comprising a multiplexing means for multiplexing program data for displaying program video and commercial data for displaying commercial video based on insertion condition information instructing insertion timing and/or insertion quantity transmitted from receiving side, and a transmitting means for transmitting the program data and the commercial data multiplexed by the multiplexing means to the receiving side.

To achieve still another object of the present invention, a broadcasting system of the present invention comprises a broadcasting system comprising a multiplexing means for multiplexing program data for displaying program video and commercial data for displaying commercial video, a transmitting means for transmitting the program data and the commercial data multiplexed by the multiplexing means, a receiving means for receiving the program data and the commercial data, an input means for inputting insertion condition data instructing insertion timing and/or insertion quantity of the commercial data into the program data, an output means for outputting the insertion condition data instructing the insertion timing and/or the insertion quantity inputted by the input means to a communication line, a display means for displaying the program video and/or the commercial video, an insertion means for inserting the commercial data into the program data based on the insertion condition data instructing the insertion timing and/or the insertion quantity inputted by the input means and providing the data to the display means. A receiving means for receiving data indicating the insertion condition information transmitted the output means via the communication line, and a storing means for storing the data indicating the insertion condition information received by the receiving means.

BRIEF DESCRIPTION OF THE DRAWINGS

These and other objects and features of the present invention will become more apparent by the following description of the preferred embodiments made with reference to the attached drawings, wherein:

FIGS. 7A to 7C are views of still another state of AV data outputted from the video data transmitting apparatus shown in FIG. 2;

FIG. 10 is a view of still another state of AV data outputted from the video data transmitting apparatus shown in FIG. 9; and FIG. 11 is a view of the configuration of the video data receiving apparatus of another embodiment of the present invention.

DESCRIPTION OF THE PREFERRED EMBODIMENTS

An explanation will be made of embodiments of the present invention by referring to FIG. 1 to FIG. 11.

Figure 1:
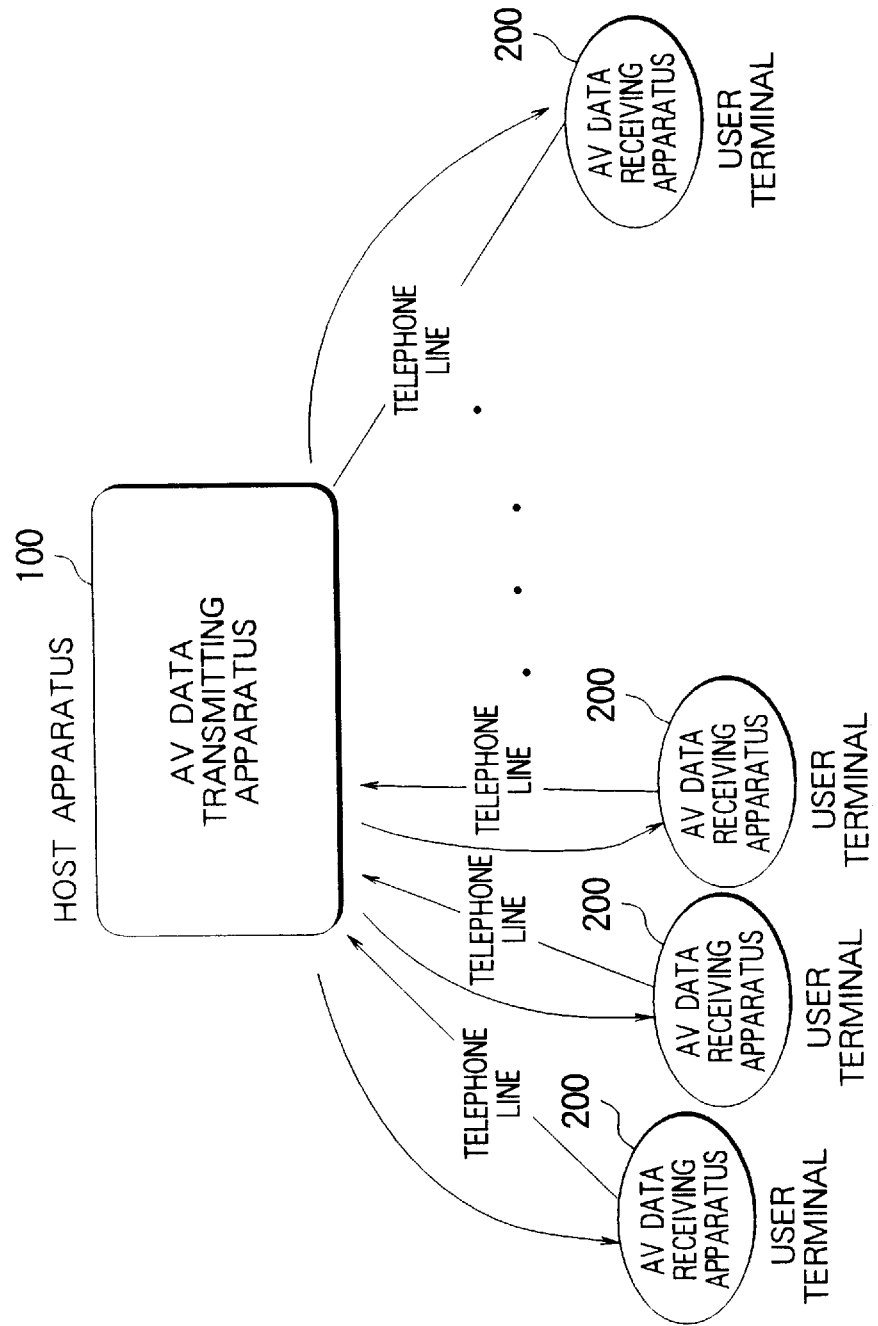
FIG. 1 is a view of a schematic configuration of a broadcasting system of one embodiment of the present invention.

In the present embodiments, the explanation will be made of a broadcasting system as shown in FIG. 1 constituted by an audio data and/or video data (AV data) transmitting apparatus serving as the host apparatus transmitting a program and an AV data receiving apparatus serving as a user terminal for receiving the program at an individual home.

More specifically, video data and audio data therefor, or at least video data (AV data or video data) is transmitted from the AV data transmitting apparatus 100 to a user based on a predetermined program schedule. Hereinafter the audio data and video data are referred as AV data. Each user views transmitted AV data with a program data receiving apparatus 200. The user selects the program and the type of insertion of CM programs into the program and views that program or that program and CMs. At this time, the state of the viewing is notified from the AV data receiving apparatus 200 to the AV data transmitting apparatus 100 via a telephone line.

Below, embodiments of the video data transmitting apparatus of the present invention and the video data receiving apparatus of the present invention used in such a broadcasting system of the present invention will be explained in detail.

First, an embodiment of an AV data transmitting apparatus of the present invention will be explained.

Figure 2:
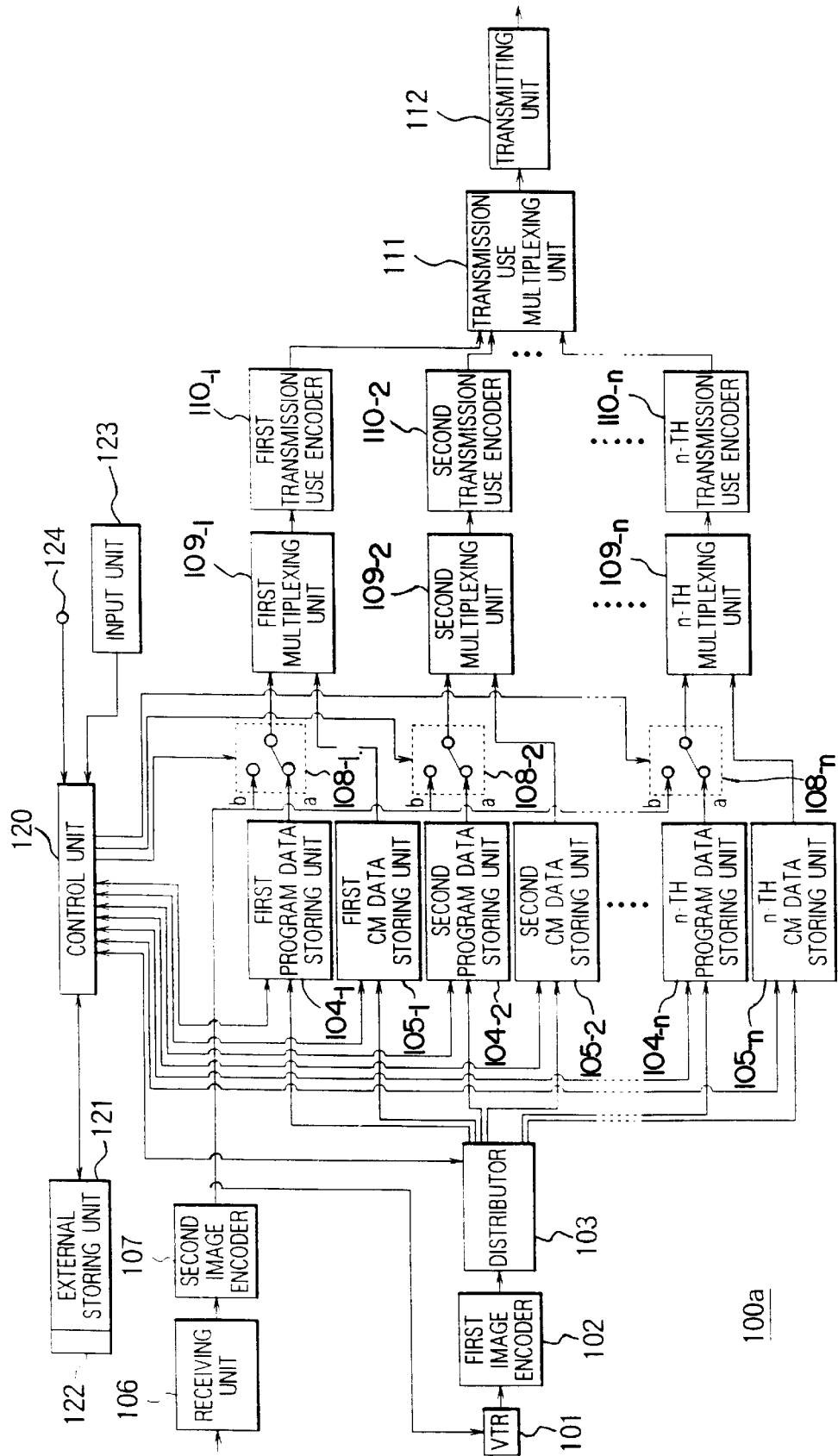
FIG. 2 is a view of the configuration of a video data transmitting apparatus of one embodiment of the present invention.

FIG. 2 is a block diagram of the configuration of an AV data transmitting apparatus 100a.

The AV data transmitting apparatus 100a comprises a VTR 101, a first image encoder 102, a distributor 103, first to n-th program data storing units $104_{-1}$ to $104_{-n}$, first to n-th CM data storing units $105_{-1}$ to $105_{-1}$, a receiving unit 106, a second image encoder 107, first to n-th selecting switches $108_{-1}$ to $108_{-n}$, first to n-th multiplexing units $109_{-1}$ to $109_{-n}$, first to n-th transmission use encoders $110_{-1}$ to $110_{-n}$, a transmission use multiplexing unit 111, and a transmitting unit 112.

First, an explanation will be made of the configuration of the units.

The VTR 101 is a reproducing apparatus for inputting the AV data to be transmitted to the AV data transmitting apparatus 100a. The AV data transmitted by the AV data transmitting apparatus 100a includes AV data recorded on a magnetic tape and AV data captured in real time and broadcasted live. Among them, about the AV data recorded and stored on the magnetic tape, the magnetic tape is set to the VTR 101 in advance. And the AV data reproduced by the VTR 101 is inputted to the AV data transmitting apparatus 100a to prepare for distribution.

The first image encoder 102 encodes and compresses the video data of the AV data inputted from the VTR 101. In the present embodiment, it is compressed by the MPEG2 (system of encoding moving pictures of Moving Picture Coding Experts Group). The AV data which amount of information is compressed by the first image encoder 102 is successively outputted to the distributor 103. This AV data comprises program data and commercial data for commercial broadcasting. And the commercial data contains video data and audio data. Note that, hereinafter, the commercial data is referred to as CM data.

The distributor 103 is a switching unit which inputs the program data included in the AV data inputted from the first image encoder 102 to any one of the first to n-th program data storing units $104_{-1}$ to $104_{-n}$ and inputs the CM data included in the AV data to any one of the first to n-th CM data storing units $105_{-1}$ to $105_{-n}$. The program data and CM data reproduced at the VTR 101 and inputted to the distributor 103 are inputted to any of the program data storing units or the CM data storing units in accordance with the number of the channel through which it is transmitted. More specifically, the program data is stored in any one of the first to n-th program data storing units $104_{-1}$ to $104_{-n}$ in correspondence to each channel i through which the data is transmitted. Further, the CM data is successively inputted and stored to the first CM data storing unit $105_{-1}$, second CM data storing unit $105_{-2}$, . . . in order of input.

Note that the distributor 103 distributes the AV data by the control of the control unit 120. The control unit 120 controls the operation of the distributor 103 based on the distributing information data inputted from the input unit 123 and stored. The distributing information data is the data indicating the relationship between the time code data and distribution channels. The control unit 120 receives the time code data of the AV data being reproduced at the present time, so that the control unit 120 decides a destination by the distributing of the AV data being reproduced at the present time.

The first to n-th program data storing units 104$_{-1}$ to 104$_{-n}$ are provided corresponding to the channels of the transmission data and store the program data, that is, the main transmission AV data inputted from the distributor 103. Note that, in the present embodiment, the first to n-th program data storing units 104$_{-1}$ to 104$_{-n}$ are constituted by hard magnetic disk devices.

The storing and reproducing operation of the first to n-th program data storing units 104$_{-1}$ to 104$_{-n}$ are controlled by the control unit 120.

The first to n-th CM data storing units 105$_{-1}$ to 105$_{-n}$ are provided corresponding to the channels of the transmission data and store additional transmission AV data such as CMs inputted from the distributor 103. Note that, in the present embodiment, the first to n-th CM data storing units 105$_{-1}$ to 105$_{-n}$ are constituted by hard magnetic disk devices.

The storing and reproducing operation of the first to n-th CM data storing units 105$_{-1}$ to 105$_{-n}$ are controlled by the control unit 120.

The receiving unit 106 is a receiving unit for receiving program data relayed from a site when transmitting a live broadcast program captured in real time from the AV data transmitting apparatus 100$a$. The received program data is inputted to the second image encoder 107.

The second image encoder 107 encodes and compresses the video data of the program data inputted from the receiving unit 106. In the present embodiment, the video data is compressed by the MPEG2 similar to the first image encoder 102. The compressed program data of the video data is inputted via a selecting switch 108$_{-i}$ (i=1 to n) to a multiplexing unit 109$_{-i}$ (i=1 to n).

The first to n-th selecting switches 108$_{-1}$ to 108$_{-n}$ are switches for selecting the program data to be outputted to the channels. To the terminal a of a selecting switch 108$_{-i}$ (i=1 to n) is inputted the program data stored in the program data storing unit 104$_{-i}$, and to the terminal b is inputted the program data from the second image encoder 107. Accordingly, the terminal a is selected at an i-th selecting switch 108$_{-i}$ when transmitting a preliminarily prepared program through a certain channel i (i=1 to n), and the terminal b is selected when transmitting a live broadcast program captured in real time.

The first to n-th multiplexing units 109$_{-1}$ to 109$_{-n}$ generate a series of transmission AV data in a channel i (i=1 to n) based on the program data selected at the first to n-th selecting switches 108$_{-1}$ to 108$_{-n}$ and the CM data stored in the first to n-th CM data storing units 105$_{-1}$ to 105$_{-n}$. There are various methods as the method of generating the transmission AV data, but in the present embodiment, first, the program data stored in a program data storing unit 104$_{-i}$ is continuously outputted after the CM data stored in the CM data storing unit 105$_{-i}$ (i=1 to n) of each channel to generate a series of transmission AV data.

As mentioned before, the program data stored in the program data storing unit 104$_{-i}$ is stored corresponding to a channel i thereof, but the CM data stored in the CM data storing unit 105$_{-i}$ is not given correspondence with the channels and can be selected by the AV data receiving apparatus mentioned later. At the point of time when it is transmitted from the AV data transmitting apparatus 100$a$, however, it is added before the program data and transmitted.

The first to n-th transmission use encoders 110$_{-1}$ to 110$_{-n}$ convert the transmission AV data inputted from the first to n-th multiplexing units 109$_{-1}$ to 109$_{-n}$ to transmission signals and output the result to the transmission use multiplexing unit 111. More specifically, a transmission use encoder 110$_{-i}$ (i=1 to n) encodes the data of the transmission AV data for transmission purposes and performs modulation for transmission etc.

The transmission use multiplexing unit 111 multiplexes the transmission signals outputted from n number of transmission use encoders 110$_{-1}$ to 110$_{-n}$ and converts the result to signals which can be transmitted and selected together in the broadcasting system.

The transmitting unit 112 actually transmits the transmission signal multiplexed in the transmission use multiplexing unit 111.

Next, an explanation will be made of the operation of the AV data transmitting apparatus 100$a$.

In the present embodiment, an explanation will be made of a case where, for example, four programs A to D and, for example, two types of CMs 1 and 2 added to them are transmitted. Note that, each of the programs A to D is a two-hour program, and each of the CMs 1 and 2 is an eight minute CM obtained by connecting CMs of for example 15 seconds and 13 seconds. Further, the programs A to D are transmitted so that they are respectively viewed in the channels 1 to 4, and the CMs 1 and 2 are transmitted so that they are appropriately outputted by the selection of the viewer in each channel. Further, the programs A to C and the CMs 1 and 2 are AV data which have been already recorded on the magnetic tape, and the program D is the AV data which is captured and relayed in real time.

First, program data containing video data and audio data of the programs A to C are successively reproduced by the VTR 101 from the magnetic tape on which the programs A to C, that is, the main programs to be transmitted, are recorded. The program data is inputted to the AV data transmitting apparatus 100$a$. Namely, the program data are successively reproduced from the VTR tape by the VTR 101, and the program data are compressed based on the MPEG2 method by the first image encoder 102.

The program A consists of the program data to be transmitted via the channel 1, therefore it is transmitted via the distributor 103 to the first program data storing unit 104$_{-1}$, the program B is the program data to be transmitted via the channel 2, therefore it is transmitted via the distributor 103 to the second program data storing unit 104$_{-2}$, and the program C is the program data to be transmitted via the channel 3, therefore it is transmitted via the distributor 103 to the first program data storing unit 104$_{-3}$.

Next, the CM data to be transmitted together with each series of program data are input.

The CM data, similar to the usual program data, is reproduced from the magnetic tape on which they are recorded by the VTR 101 and compressed by the first image encoder 102. Then, the compressed CM data is successively stored starting from the first CM data storing unit 105$_{-1}$. More specifically, the CM data of the CM 1 is stored in the first CM data storing unit 105$_{-1}$, and the CM data of CM 2 is stored in the second CM data storing unit 105$_{-2}$.

This ends the preparation of the transmission data.

When the program data is transmitted, the first selecting switch 108$_{-1}$ to the third selecting switch 108$_{-3}$ are switched to the a side, and the program data stored in the first to third program data storing units 104$_{-1}$ to 104$_{-3}$ are selected.

Further, the fourth selecting switch $108_{-4}$ is switched to the b side, and the live broadcast program received at the receiving unit 106 is selected. The control unit 120 controls the first to n-th selecting switches $108_{-1}$ to $108_{-n}$ based on data indicating the transmitting form inputted by the input unit.

Figure 3:
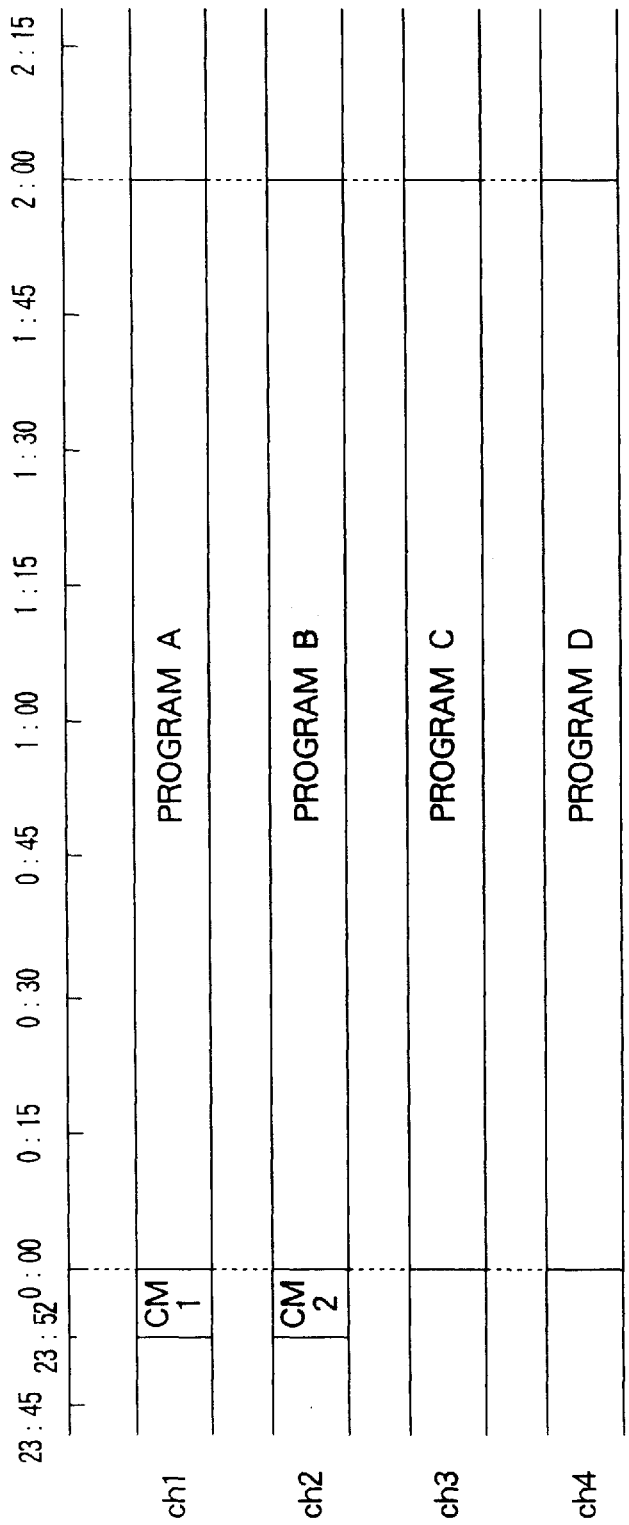
FIG. 3 is a view of a state of AV data outputted from the video data transmitting apparatus shown in FIG. 2.

Then, eight minutes before the time when the program data is scheduled to be provided, as shown in FIG. 3, if the program air time is 0:00, the transmission of the CM data is first started from the time 23:52 via the channel 1 and the channel 2. More specifically, the CM data stored in the first CM data storing unit $105_{-1}$ and the second CM data storing unit $105_{-2}$ is reproduced, and the reproduced CM data is inputted to the first transmission use encoder $110_{-1}$ and the second transmission use encoder $110_{-2}$ via the first multiplexing unit $109_{-1}$ and the second multiplexing unit $109_{-2}$. In the first transmission use encoder $110_{-1}$ and the second transmission use encoder $110_{-2}$, the AV data of that CM is encoded. The transmission signals of the channel 1 and the channel 2 are multiplexed at the transmission use multiplexing unit 111 and transmitted by the transmitting unit 112.

Next, eight minutes after this, that is, when the time becomes 0:00, the main program covered by the transmission is transmitted. The programs A to C stored in the first to third program data storing units $104_{-1}$ to $104_{-3}$ are reproduced, and the reproduced series of program data are inputted via the first to third selecting switches $108_{-1}$ to $108_{-3}$ to the first to third multiplexing units $109_{-1}$ to $109_{-3}$. Further, for the live broadcast program D received at the receiving unit 106, for example, a sports broadcast, the video data is compressed in the second image encoder 107 and inputted via the fourth selecting switch $108_{-4}$ to the fourth multiplexing unit $109_{-4}$.

Then, the program data inputted to the first to fourth multiplexing units $109_{-1}$ to $109_{-4}$ are encoded at the first to fourth transmission use encoders $110_{-1}$ to $110_{-4}$, multiplexed at the transmission use multiplexing unit 111, and transmitted from the transmitting unit 112.

By such processing, the AV data transmitting apparatus 110a generates and transmits the data stream of the programs shown in FIG. 3.

Note that, it is also possible that an AV data receiving apparatus 200a, explained later, provides the insertion condition data indicating insertion timing and/or insertion quantity of the insertion of the CM data into the program data to this AV data transmitting apparatus 110a, the control unit 120 of the AV data transmitting apparatus 100a receives the insertion condition data via the input terminal 124, the control unit 120 controls the operation of the first to n-th program data storing units $104_{-1}$ to $104_{-n}$, the first to n-th CM data storing units $105_{-1}$ to $105_{-n}$, and the first to n-th selecting switches $108_{-1}$, to $108_{-n}$ based on the insertion condition data to multiplex the CM data and the program data to satisfy the condition, and the multiplexed CM data and program data are transmitted to the AV data receiving apparatus 200a.

Next, an explanation will be made of one embodiment of the AV data receiving apparatus of the present invention.

Figure 4:
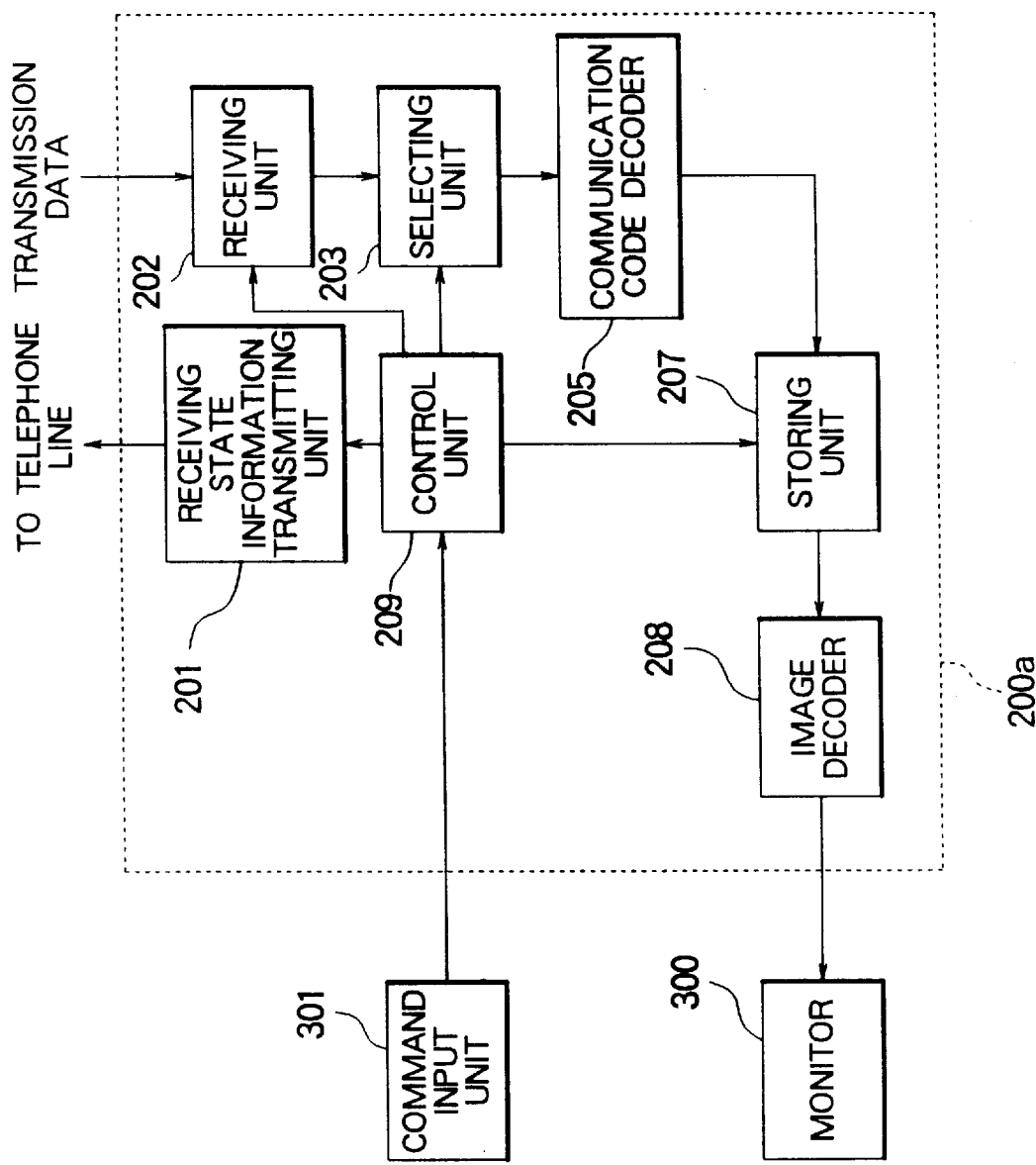
FIG. 4 is a view of the configuration of a video data receiving apparatus of one embodiment of the present invention.

FIG. 4 is a block diagram of the configuration of the AV data receiving apparatus 200a.

The AV data receiving apparatus 200a comprises a receiving state information transmitting unit 201, a receiving unit 202, a selecting unit 203, a communication code decoder 205, a storing unit 207, an image decoder 208, and a control unit 209.

Note that the AV data receiving apparatus 200a has connected to it a monitor 300 and a command input unit 301.

The viewer selects a desired program and a method of insertion of CMs with respect to that program, the amount of insertion, and the type of CMs by the command input unit 301 and views the program and CMs displayed on the monitor 300.

First, an explanation will be made of the configuration of the units.

The receiving state information transmitting unit 201 is a transmitting apparatus for transmitting the program received at the AV data receiving apparatus 200 and information such as the selected amount of the CMs, type, and method of insertion thereof to the originating side of the AV data. The receiving state information is inputted to the input terminal 124 of the control unit 120 of the AV data transmitting apparatus 100a as the originating side via for example a telephone line. Note that, this information is used for obtaining a grasp of the state of reception for every user at the originating side and as the basic information for charges in the pay system.

And the receiving state information data are stored by the external storing unit 121 into, for example, the floppy disk 122 with the user identification code data which is added to the information and transmitted.

The receiving unit 202 receives the signal transmitted from the AV data transmitting apparatus 100a, separates the multiplexed signals of the channels, and outputs the results to the selecting unit 203. The receiving unit 202 is controlled by a control signal generated at the control unit 209 based on the program selection signal inputted by the viewer from the command input unit 301.

The selecting unit 203 selects the signal of one channel from among the signals of a plurality of channels inputted from the receiving unit 202 and outputs the result to the communication code decoder 205. This one channel is also selected out based on the control signal from the control unit 209.

The communication code decoder 205 decodes the reception signal inputted from the selecting unit 203, returns this to a program data stream or CM data stream, and outputs the result to the storing unit 207.

The storing unit 207 is a storage means for storing the program data stream and CM data stream inputted from the communication code decoder 205. In the present embodiment, the storing unit 207 has a storage capacity enough to store 20 minutes worth of AV data. Further, the storing unit 207 is constituted by a memory which can simultaneously input and output data such as a dual port RAM and can simultaneously input the data from the communication code decoder 205 and output the data to the image decoder 208. Further, it is also possible for the storing unit 207 to pass the input data therethrough and immediately output the same to the image decoder 208.

The image decoder 208 successively reads the program data and CM data stored in the storing unit 207 based on the control signal from the control unit 209 and decodes that video data. In the AV data transmitting apparatus 100a, the video data is compressed by MPEG2 and transmitted, therefore, in the image decoder 208, the video data compressed by that MPEG2 is expanded and returned to the original video data. The decoded program data of the video data is outputted from the AV data receiving apparatus 200a to provide the monitor 300, and is outputted so that it can be viewed by the monitor 300.

The control unit 209 controls the units constituting the AV data receiving apparatus 200a to perform the desired operations.

More specifically, for example, the reception condition such as the reception channel is set in the receiving unit 202 so that the channel group containing the desired program can be received based on a program selection signal inputted by the receiver from the command input unit 301.

Further, the control unit 209 controls the selection operation of the reception signal in the selecting unit 203. The selecting unit 203 selects any single type of CMs from among a plurality of CMs transmitted via a plurality of channels before the transmission of the program based on the selection information of the type of CMs inputted by the receiver from the command input unit 301.

Further, the control unit 209 controls the storing unit 207 and adjusts things so that the data of CMs or program which was received is reproduced in the form intended by the receiver. Namely, it adjusts whether the AV data inputted from the communication code decoder 205 is outputted to the image decoder 208 as it is or stored in the storing unit 207. Further, simultaneously, it adjusts whether the AV data stored in the storing unit 207 is outputted as the AV data outputted to the image decoder 208 or the AV data inputted from the communication code decoder 205 is outputted as it is.

Next, an explanation will be made of the operation of the AV data receiving apparatus 200a.

In the AV data receiving apparatus 200a of the present embodiment, the amount of viewing of CMs can be selected according to the number of times of insertion of CMs and the length of CMs per time. Further, when inserting the CM programs, it can be selected whether to insert them at predetermined positions which are determined in advance or to insert them at any selected time. Further, where the program to be audited is a live broadcast program such as a sports broadcast, it can be selected whether to ignore the AV data broadcasted during the periods when the CMs were inserted and view the program in real time or to view the AV data broadcasted during the insertion of CMs later after the end of the CMs.

Note that, it is assumed that the AV data receiving apparatus 200a receives the transmission data as shown in FIG. 3.

Figure 5:
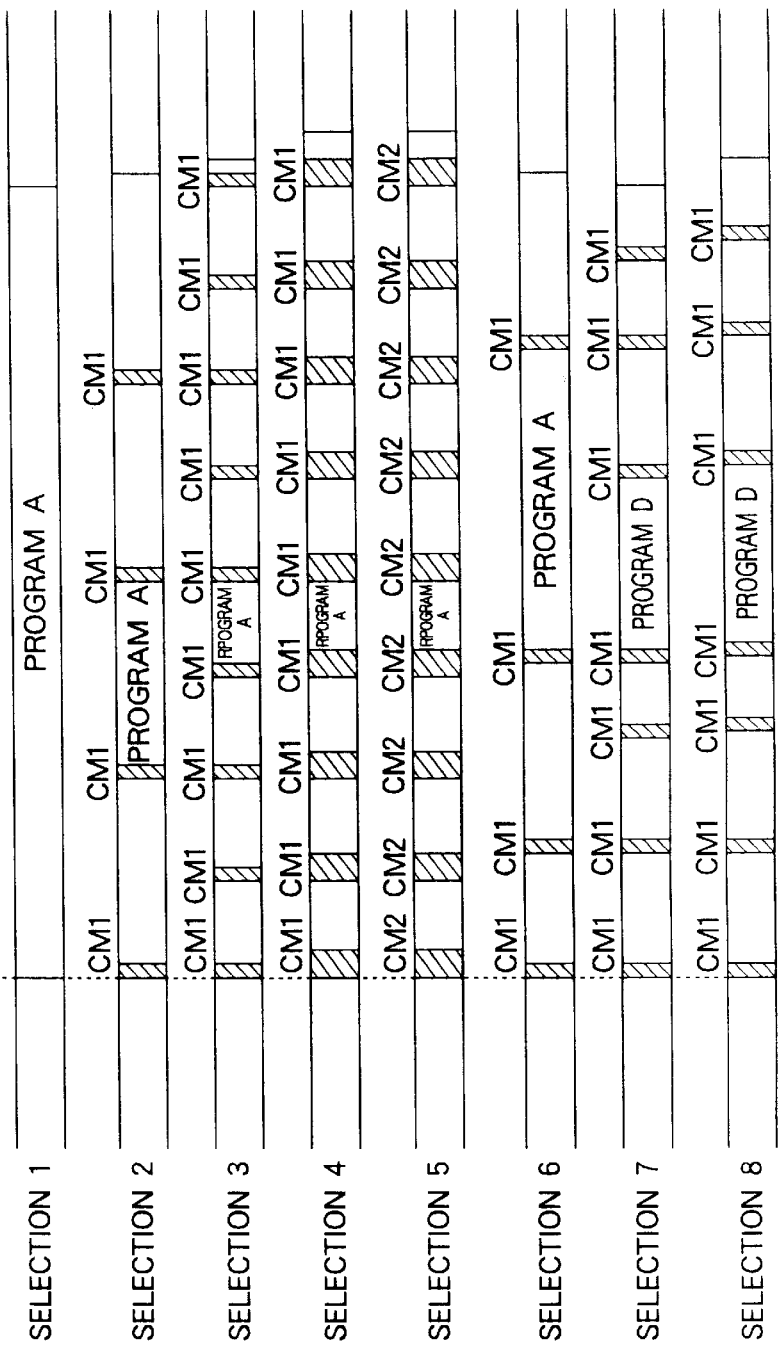
FIG. 5A is a view of a state where program data is viewed with no insertion of any CMs using the video data receiving apparatus shown in Fig.4.
FIG. 5B is a view of a state where program data is viewed with CMs of 30 seconds inserted every 30 minutes using the video data receiving apparatus shown in FIG. 4.
FIG. 5C is a view of a state where program data is viewed with CMs of 30 seconds inserted every 15 minutes using the video data receiving apparatus shown in FIG. 4.
FIG. 5D is a view of a state where program data is viewed with CMs of one minute inserted every 15 minutes using the video data receiving apparatus shown in FIG. 4.
FIG. 5E is a view of a state where program data is viewed with another CM of one minute inserted every 15 minutes using the video data receiving apparatus shown in FIG. 4.
FIG. 5F is a view of a state where program data is viewed with CMs inserted at optional times using the video data receiving apparatus shown in FIG. 4.
FIG. 5G is a view of a state where program data is viewed while cutting the program during the insertion of CMs using the video data receiving apparatus shown in FIG. 4.
FIG. 5H is a view of a state where program data is viewed while delaying the program during the insertion of CMs using the video data receiving apparatus shown in FIG. 4.

Below, an explanation will be made of the operation of the AV data receiving apparatus 200a in each selection state as shown in FIG. 5 by referring to the reproduction state of the AV data in accordance with the selection condition of the receiver.

FIG. 5A is a view of the state of the AV data outputted from the AV data receiving apparatus 200a when the receiver desires to view the program A without insertion of CMs. In this case, in the AV data receiving apparatus 200a, chanel 1 (ch1) is selected from the time 0:00 in the selecting unit 203, the reception signal thereof is decoded at the communication code decoder 205, and the decoded AV data is not stored in the storing unit 207, but immediately inputted to the image decoder 208. Then, in the image decoder 208, the video data is decoded and outputted to the monitor 300. As a result, the program A is started from the time 0:00 as illustrated and the program A is outputted without interruption until the time 2:00.

FIG. 5B is a view of the state of the AV data outputted from the AV data receiving apparatus 200a when the receiver desires to view the program A with the CM 1 of a comparatively small number of times of insertion and a short time per insertion inserted at predetermined times. In this case, in the AV data receiving apparatus 200a, the ch1 through which the AV data of CM 1 is transmitted is selected at the selecting unit 203 from the time 23:52 at which the transmission of CM is started and the reception of that data is started. The AV data of the received CM 1 is successively stored in the storing unit 207.

When the time becomes 0:00, the same ch1 through which the AV data of the program A is transmitted is selected at the selecting unit 203 and the reception of that data is started. The AV data of the received program A is stored in the storing unit 207. Further, when the time becomes 0:00, the output of the CM 1 which has been already stored in the storing unit 207 is started from the storing unit 207. Namely, the data of CM 1 is read from the storing unit 207 and outputted via the image decoder 208 to the monitor 300. When the CM1 is outputted for 30 seconds, the storing unit 207 starts the output of the AV data of the program A received and stored at the time 0:00. Accordingly, AV data delayed from the reception time by 30 seconds is outputted from the storing unit 207.

When the time becomes 0:30, the storing unit 207 interrupts the output of the program A again and outputs the data subsequent to the CM 1 for 30 seconds. As a result, a CM of 30 seconds is outputted again to the viewer at the time 0:30. The AV data of the program A received during this time is stored in the storing unit 207. Then, when the time becomes 0:30:30, the storing unit 207 starts the output of the AV data of the program A received and stored one minute before this time.

Below, similarly, AV data of 30 seconds each is inserted at the time 1:00 and 1:30. As a result, the output AV data becomes as shown in FIG. 5B. Namely, the viewer views a CM of 30 seconds every 30 minutes and can end the viewing of the program A at the time 2:02.

Note that, to enable such a reception, the storing unit 207 must have a storage capacity enough to store data of at least the amount of output of the CM 1, that is, two minutes.

FIG. 5C is a view of the state of the AV data outputted from the AV data receiving apparatus 200a when the receiver desires to view the program A with the CM 1 of a comparatively large number of times of insertion but short time per insertion inserted. The basic operation in this case is the same as the case of FIG. 5B. First, from the time 23:52 at which the transmission of the CM is started, the ch1 through which the AV data of the CM 1 is transmitted is selected at the selecting unit 203, the reception of the CM 1 is started, and the AV data is stored in the storing unit 207.

When the time becomes 0:00, the same ch1 through which the AV data of the program A is transmitted is selected at the selecting unit 203, the reception of the data is started, and the AV data of the program A is stored in the storing unit 207. Further, the output of the CM 1 is started from the storing unit 207. Then, when the CM 1 is outputted for 30 seconds, the output of the AV data of the program A received at time 0:00 is started.

Then, in the reception state of FIG. 5C, the output of the program A is interrupted when the time becomes 0:15, and the data subsequent to the CM1 is outputted for 30 seconds. As a result, a CM of 30 seconds is outputted again to the viewer at the time 0:15. Below, similarly, AV data of 30 seconds each is inserted at the time 0:30, 0:45, 1:00, 1:15, 1:30, and 1:45. As a result, the output AV data becomes as shown in FIG. 5C, and the viewer views a CM of 30 seconds every 15 minutes, i.e., eight times in all, and finishes viewing the program A at the time 2:04.

Note that, so as to enable such reception, the storing unit 207 must have a storage capacity enough to store AV data of at least the amount of output of the CM 1, that is, four minutes.

FIG. 5D is a view of the state of the AV data outputted from the AV data receiving apparatus 200a when the receiver selects such the method of viewing where a relatively large number of CMs are inserted. In this case as well, the basic operation is the same as those of the cases of FIGS. 5B and 5C, but the output time per insertion of CMs becomes one minute. Namely, in this case, the AV data receiving apparatus 200a outputs the CM 1 for one minute from the time 0:00 and then starts the output of the AV data of the program A received at the time 0:00. The viewer views a one minute CM every 15 minutes, i.e., eight times in all, and finishes viewing the program A at the time 2:08.

Note that, so as to enable such reception, the storing unit 207 must have a storage capacity enough to store AV data of at least the amount of output of the CM 1, that is, eight minutes.

In FIG. 5E, the amount of CMs and insertion method are the same as those of the case of FIG. 5D, but the type of the selected CM is different. Namely, it is a view of the state of the AV data outputted from the AV data receiving apparatus 200a when the viewer desires to view the CM 2. In this case, in the AV data receiving apparatus 200a, channel 2 (ch2) through which the AV data of CM 2 is transmitted is selected in the selecting unit 203 from the time 23:52 at which the transmission of CM is started and the reception of that data is started. The AV data of the received CM 2 is successively stored in the storing unit 207.

When the time becomes 0:00, the ch1 through which the AV data of the program A is transmitted is selected in the selecting unit 203 and the reception of that data is started. The AV data of the received program A is stored in the storing unit 207. Then, from the time 0:00, the output of the CM 2 which has been already stored in the storing unit 207 is started. Namely, the AV data of CM 2 is read from the storing unit 207 and outputted via the image decoder 208 to the monitor 300. Then, when the CM 2 is outputted for one minute, the storing unit 207 outputs the AV data of the program A received and stored at the time 0:00. The rest of the operation is the same as that of the case of FIG. 5D explained before.

FIG. 5F shows a case where the viewer desires to view the program with the CM 1 inserted so that the amount becomes as small as possible, that is, both the number of times of insertion is small and the time per insertion is short, similar to the case of FIG. 5B except the CMs are inserted at any desired time.

In this case as well, the ch1 through which the AV data of the CM 1 is transmitted is selected at the selecting unit 203 from the time 23:52 at which the transmission of the CM is started, the reception of that data is started, and the received data is stored in the storing unit 207. When the time becomes 0:00, the ch1 through which the data of the program A is transmitted is selected and the received data is stored in the storing unit 207 and, at the same time, the output of the CM 1 which has been already stored in the storing unit 207 is started. Then, when the CM 1 is outputted for 30 seconds, the output of the AV data of the program A which was received and stored at the time 0:00 is started.

Thereafter, when the control unit 209 outputs the control signal for CM insertion to the storing unit 207 based on the CM insertion command inputted to the control unit 209 at any desired time, the storing unit 207 interrupts the output of the program A and outputs the data subsequent to the CM 1 for 30 seconds. The AV data of the program A received during this time is stored in the storing unit 207. Below, similarly, the CMs are inserted based on CM insertion commands generated at any desired time.

In the present embodiment, it is assumed that the CM insertion command is inputted from the command input unit 301 by the viewer. Namely, the viewer can view the CMs at any optional desired time while viewing the program.

Note that, this CM insertion command may be inputted superimposed on the transmitted AV data or may be generated by any method.

FIGS. 5G and 5H show the case where the method of insertion of the CMs can be selected when viewing a live broadcast program or the like.

In FIG. 5G, the AV data received during the insertion of a CM is not output, but the AV data at the point of time of reception is outputted as the program. Namely, the program is outputted respecting the real time property.

In this case as well, the ch1 through which the AV data of the CM1 is transmitted is selected at the selecting unit 203 from the time 23:52 at which the transmission of CM is started, the reception of that data is started, and the received data is stored in the storing unit 207. When the time becomes 0:00, the selecting unit 203 selects the channel 4 (ch4) through which the data of program D, that is, a live broadcast program, is transmitted, but does not store the received data. On the other hand, it starts the output of the CM 1 which has been already stored in the storing unit 207. Then, when outputting the CM 1 for 30 seconds, it outputs the AV data of the program A received through the ch4 as it is.

Next, based on for example a CM insertion command superimposed on the data of the program to be received, when the time becomes the time for insertion of a CM, the storing unit 207 outputs the 30 seconds of data subsequent to the CM 1 which has been already stored. The output of the program D is interrupted during this time. The AV data of the program D during the interruption is discarded as it is. Then, when the CM is ended, the AV data of the received program D is outputted again from that point of time.

In this way, in the method of viewing of a program as shown in FIG. 5G, while it becomes impossible to view the program during a CM, it becomes possible to view the received AV data in real time.

In FIG. 5H, the AV data received during the insertion of a CM is stored and outputted without breakage of the continuity of the received AV data.

From the time 23:52 at which the transmission of CM is started, the ch1 through which the AV data of the CM1 is transmitted is selected at the selecting unit 203, the reception of that data is started, and the received data is stored in the storing unit 207. When the time becomes 0:00, the selecting unit 203 selects the ch4 through which the data of program D, that is, the live broadcast program, is transmitted, and successively stores the data received during this time in the storing unit 207. Then, it starts the output of the CM 1 which has been already stored in the storing unit 207. Then, when outputting the CM 1 for 30 seconds, it outputs the AV data of the program D received 30 seconds before which is stored in the storing unit 207.

Then, based on for example a CM insertion command superimposed on the data of he program to be received, when the time becomes the time for insertion of a CM, the storing unit 207 outputs the 30 seconds of data subsequent to the CM 1 which has been already stored. Also, during this period, the received AV data of the program D is successively stored in the storing unit 207. When the CM is ended, the data subsequent to the program D stored in the storing unit 207 is output.

In this way, in the method of viewing a program as in FIG. 5H, the real time property of the program D is lost, but it becomes possible to view the data while maintaining continuity without missing any part of the program.

If the AV data transmitted by the AV data transmitting apparatus 100a of the present embodiment as mentioned before is received and the program is viewed by the AV data receiving apparatus 200a of the present embodiment in this way, the amount, the type, and the form of insertion of the CMs, that is, AV data of the ancillary object of transmission, and the form of output of the program, that is, the AV data of the main object of transmission, can be controlled to any form and the AV data can be received in the form desired by the viewer.

Further, in the AV data receiving apparatus 200a of the present embodiment, the form of reception selected by the viewer can be transmitted to the transmission side, therefore the form of reception of each viewer can be precisely grasped at the transmission side.

Next, an explanation will be made of embodiments of the other operation of the AV data transmitting apparatus 100a shown in FIG. 1.

In the embodiment of the operation of the AV data transmitting apparatus 100a mentioned above, however, the AV data of the CMs reproduced at the VTR 101 and encoded at the image encoder 102 was switched by the distributor 103 and stored in any one of the n number of CM data storing units $105_{-1}$ to $105_{-n}$. More specifically, a plurality of CMs which are successively reproduced were successively stored starting from the first CM data storing unit $105_{-1}$.

In the embodiment of operation, being explained here, of the AV data transmitting apparatus 100a, when generating the AV data of a CM, the AV data of the CM is outputted to and stored in the CM data storing units $105_{-i}$ (i=1 to m; m≦n) of all channels through which the program data of the main object of transmission is transmitted. In the transmission data, as shown in FIG. 6, all CMs which may be selected are added before each program data for every channel, and the resultant data is transmitted.

In the embodiment of operation, explained referring to FIG. 3, of the AV data transmitting apparatus 100a of the first embodiment, as shown in FIG. 3, the CMs and main program are considered to be completely independent from each other, and the CMs were transmitted through any channel. As a result, even if the viewer selected to view the program B, if the selected CM was the CM 1, the viewer had to select ch1 first until the time 0:00, and had to select the channel through which the program of the main object of transmission was transmitted at the time after 0:00.

Figure 6:
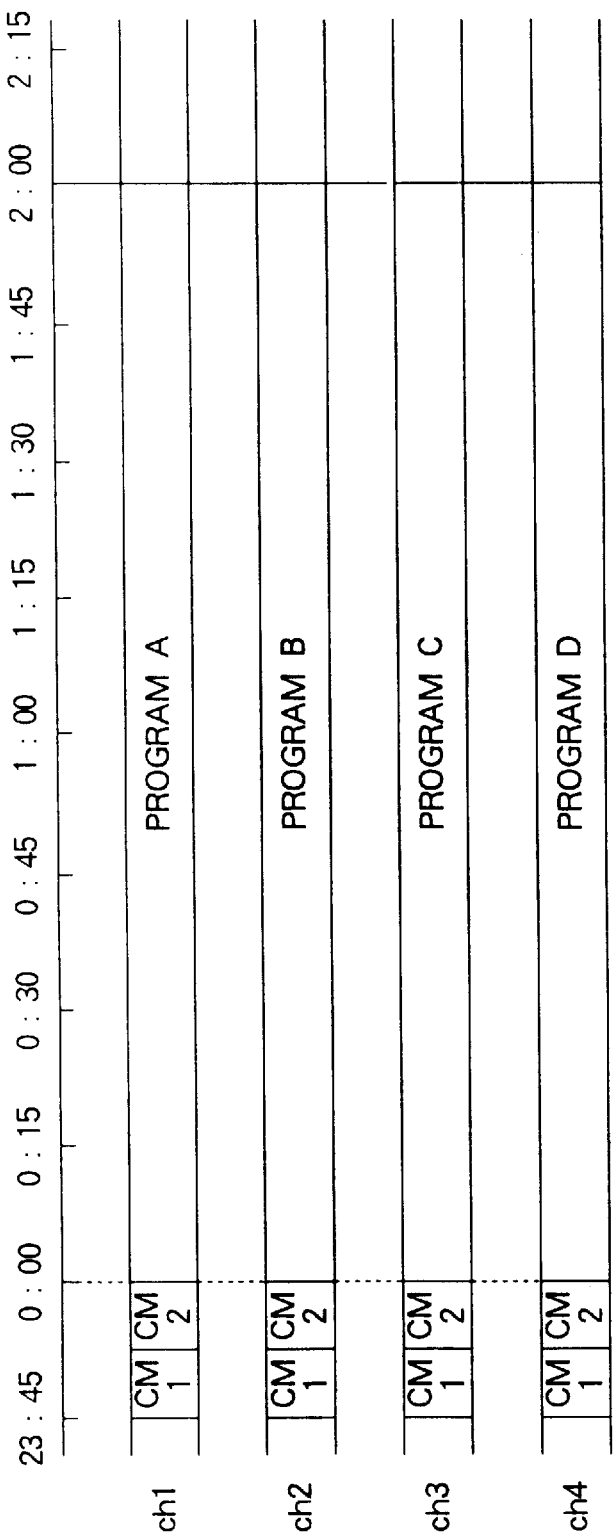
FIG. 6 is a view of another state of AV data outputted from the video data transmitting apparatus shown in FIG. 2.

In the other embodiment of operation, being explained referring to FIG. 6, of the AV data transmitting apparatus 100, however, when the viewer selects the channel through which the program selected by the viewer is transmitted first, all CMs enabling the viewing of the program in the desired form as mentioned before can be received for every channel. As a result, in the AV data receiving apparatus 200a, fine control with respect to the selecting unit 203 becomes unnecessary.

An explanation will next be made of still another embodiment of operation of the AV data transmitting apparatus.

In this embodiment, the functions of the first to n-th multiplexing units 109 are different from that of the embodiments mentioned above. Further, in this embodiment, the format of the transmission data is different from the format of the embodiments mentioned before.

The multiplexing unit 109 of the present embodiment does not transmit the data of the CM first and then transmit the data of the program of the main object of transmission, but multiplexes the data of the CM in the data of the program for transmission.

In the still another embodiment of operation of the AV data transmitting apparatus 100 the data of the program is stored in the program data storing unit $104_{-i}$, and the data of the CMs is stored in the CM data storing unit $105_{-i}$ for each channel. Then, in the multiplexing unit $109_{-i}$, part of the data of the CMs read from the CM data storing unit $105_{-i}$ is inserted in the vertical synchronization of the video data read from the program data storing unit $104_{-i}$, and the AV data of the program and the AV data of the CM are multiplexed. More specifically, as shown in FIG. 7A, the 20 lines worth of the CM data are inserted during one field of the program data.

As a result, as shown in FIG. 7B, when it is assumed that the number of the valid lines is 480 lines (case of an NTSC signal), the video data of one frame of a CM is transmitted by 12 frames (24 fields). Further, the audio data and control information for a frame of the CM become an amount of information that can be transmitted by 3 frames worth of the program data. For this reason, in the end, as shown in FIG. 7B, data of an amount of one frame of a CM is multiplexed in 15 frames of the program data. As a result, as shown in FIG. 7C, it becomes possible to multiplex one CM of 15 seconds with program data of a length of 225 seconds, and four CMs of 15 seconds with program data of 15 minutes, that is, one minute of CMs.

Figure 8:
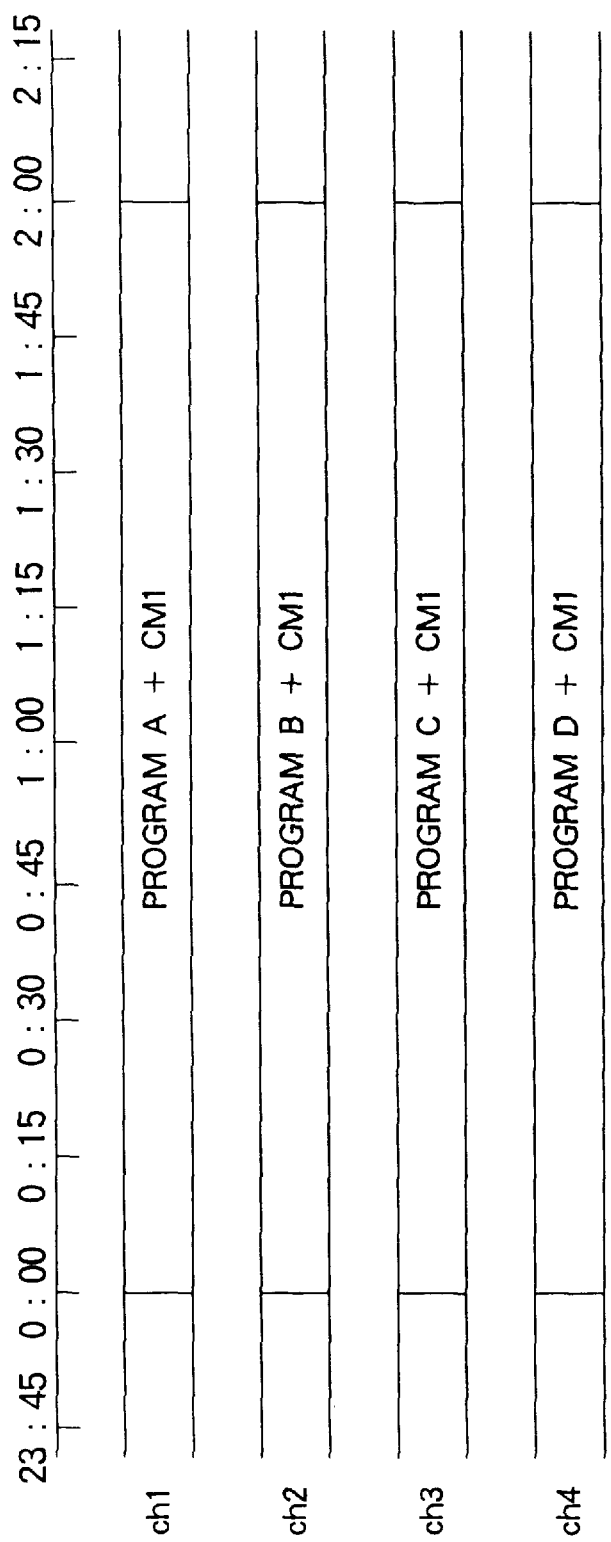
FIG. 8 is a view of still another state of AV data outputted from the video data transmitting apparatus shown in FIG. 2.

The data multiplexed in this way is generated at the multiplexing unit 109 and then similarly encoded at the transmission use encoder 110. Signals of each channel are multiplexed at the transmission use multiplexing unit 111 and transmitted from the transmitting unit 112. As a result, the data in which the program and CM are multiplexed as shown in FIG. 8 is transmitted. When adopting such a configuration, it becomes possible for the viewer to adequately view the program even in a case where viewing of the program is required immediately before the time 0:00, etc.

An explanation will be made of another embodiment of the AV data transmitting apparatus of the present invention.

Figure 9:
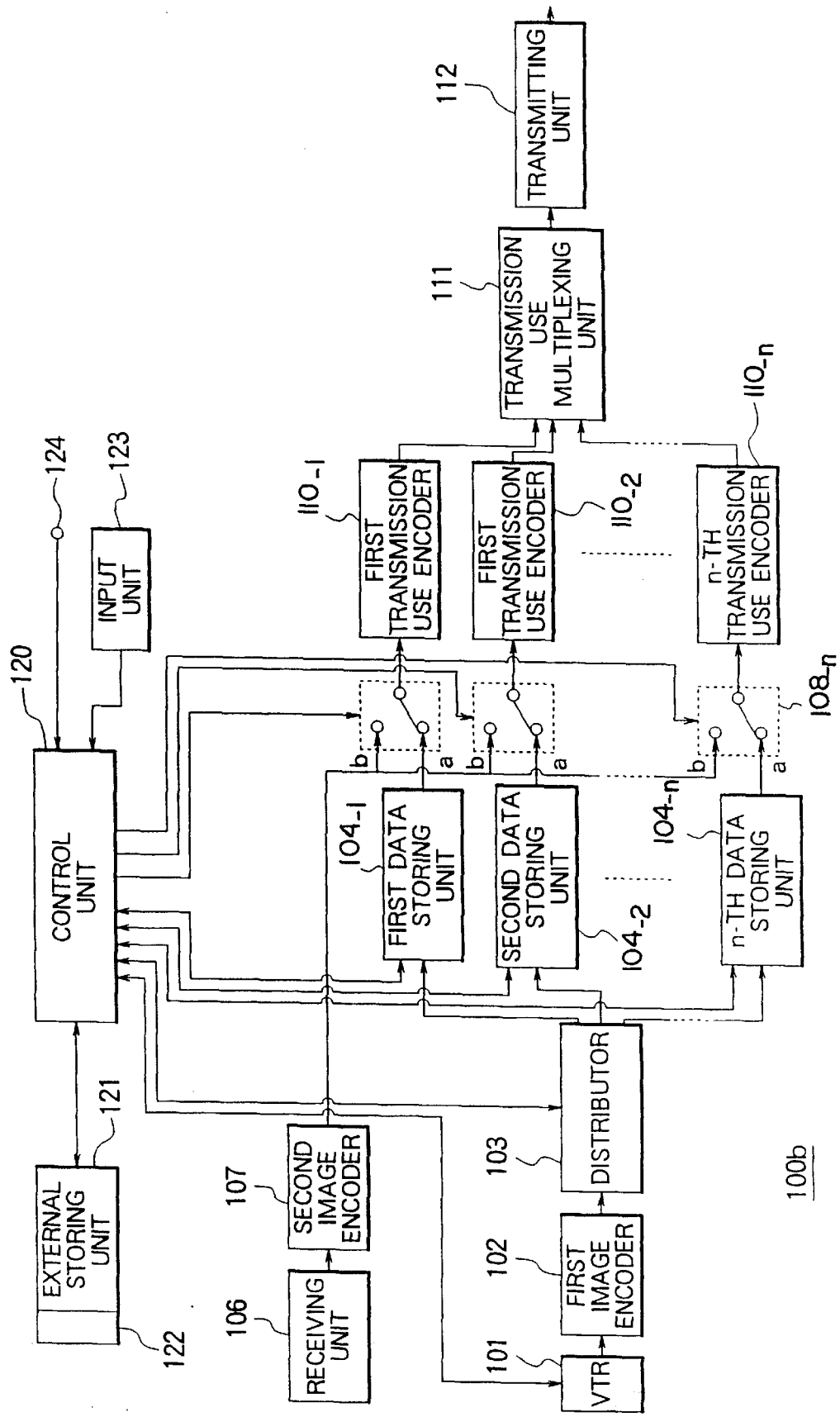
FIG. 9 is a view of the configuration of the video data transmitting apparatus of another embodiment of the present invention.

The configuration of the AV data transmitting apparatus 100b of the another embodiment is shown in FIG. 9.

The AV data transmitting apparatus 100b shown in FIG. 9 comprises a configuration in which the first to n-th CM data storing units $105_{-1}$ to $105_{-n}$ and first to n-th multiplexing units $109_{-1}$ to $109_{-n}$ of the AV data transmitting apparatus 100a are omitted.

The same portions with the configuration of the AV data transmitting apparatus 100a shown in FIG. 1 are added the same reference number, and the explanation of the portions are omitted.

In an AV data transmitting apparatus 100b of such a configuration, a CM is treated as a program and the AV data is transmitted providing a private channel for the CMs. Namely, when reproducing a CM at the VTR 101, the AV data encoded at the image encoder 102 thereof is all stored in the fifth program data storing unit $104_{-5}$.

Then, at the transmission of the AV data, the CM data stored in this fifth program data storing unit $104_{-5}$ is repeatedly read and transmitted via the channel 5 (ch5) in parallel with the transmission of the program A to program D stored in the first to fourth program data storing units $104_{-1}$ to $104_{-4}$.

The state of transmission of that AV data is shown in FIG. 10.

As shown in FIG. 10, similar to the above embodiment, from the time 0:00, the transmission of the program A to program D is started through ch1 to ch4. Then, further, the CM data is repeatedly transmitted to the ch5.

Even if the program data and the CM data are transmitted by adopting such a configuration, processing similar to that of the case where the AV data is transmitted by the AV data transmitting apparatuses of the above embodiments is possible.

Then, when adopting such a form of transmission, the AV data transmitting apparatus 100 does not require the n number of CM data storing units 105 and n number of multiplexing units 109 and therefore the configuration of the apparatus becomes simpler.

An explanation will next be made of a modification of the AV data receiving apparatus shown in FIG. 4.

The AV data receiving apparatus 200b of this modified embodiment receives the AV data of the main program and the CM data transmitted as shown in FIG. 10 by the AV data transmitting apparatus 100b as shown in FIG. 9 and outputs the result to the monitor 300 in the desired form.

FIG. 11 is a block diagram of the configuration of that AV data receiving apparatus 200b.

The AV data receiving apparatus 200b further comprises a second selecting unit 204 and a second communication code decoder 206 in addition to the configuration of the AV data receiving apparatus 200a shown in FIG. 4.

The first selecting unit 203 selects the signal of the channel through which the program of the main object of transmission is transmitted from among the signals of a plurality of channels inputted from the receiving unit 202 and outputs the result to the first communication code decoder 205.

Further, the second selecting unit 204 always selects the channel through which the AV data of the CMs is transmitted from among the signals of a plurality of channels received at the receiving unit 202 and outputs the result to the second communication code decoder 206.

The first communication code decoder 205 decodes the reception signal inputted from the first selecting unit 203, returns this to the program data stream, and outputs the result to the storing unit 207.

Further, the second communication code decoder 206 decodes the CM data inputted from the second selecting unit 204, returns this to the CM data stream, and outputs the result to the storing unit 207.

In the storing unit 207, when the time becomes 0:00, first, the CM data inputted from the second communication code decoder 206 is outputted to the image decoder 208 as it is for 30 seconds. During this time, the AV data of the desired program inputted from the first communication code decoder 205 is stored in the storing unit 207. When the CM is outputted for 30 seconds and the time becomes 0:00:30, the storing unit 207 starts the output of the AV data of the desired program of 30 seconds before which was received from the time 0:00 and has been already stored in the storing unit 207. Note that, even during this period, the AV data inputted from the communication code decoder 205 to the storing unit 207 is successively stored in the storing unit 207. At this time, in the storing unit 207, 30 seconds worth of the AV data is always stored.

Then, when the time becomes 0:30, the storing unit 207 selects the AV data of the CMs inputted from the second communication code decoder 206 again and outputs this to the image decoder 208. During this time, the AV data inputted from the first communication code decoder 205 is successively stored in the storing unit 207. When the output of 30 seconds of the CMs is ended, the storing unit 207 outputs the AV data of the desired program which is stored. At this time, in the storing unit 207, one minute of the AV data is always stored.

Below, similarly, when the CM is output, the AV data from the second communication code decoder 206 is selected, and the AV data of the program during this period is stored in the storing unit 207. By doing this, the AV data can be outputted in the form as shown in FIG. 5B.

Note that, in this explanation, the explanation was made of a case where the signal of the format as shown in FIG. 10 was received and the program and CM were outputted in the form as shown in FIG. 5B, but similar to the AV data receiving apparatus 200a shown in FIG. 4, the AV data can be outputted in any form of FIGS. 5A to 5H in accordance with the requirement of the viewer.

Further, when CM data and program data are multiplexed based on the insertion condition data to satisfy the insertion condition by the AV data transmitting apparatus 100a and are transmitted to the AV data receiving apparatus 200a or 200b, the operation that the CM data are inserted into the program data based on the insertion condition is not necessary in the AV data receiving apparatus 200a or 200b so that the AV data receiving apparatus 200a or 200b is only to display the received CM data and program data. Note, in this case, the insertion condition data are inputted in advance from the command input unit 301 before the reception of the CM data and the program data. The inputted insertion condition data are provided to the receiving state information transmitting apparatus 201 via control unit 209 and transmitted to the control unit 120 of the AV data transmitting apparatus 100a via communication line said as telephone line.

Further, by the external storing unit 121 of the AV data transmitting apparatus 100a or 100b, the data indicating the quantity, the types and the insertion method etc. of the CM data selected with program data by each viewers are stored in, for example, the floppy disk 121. Accordingly, the provided using the AV data transmitting apparatus 100a or 100b commercially can get the information of such as the quantity, the types and the insertion method etc. of the CM data selected with received program data easily based on the data to use the information as the basic information for charge. The charge demanding systems, such as demanding the payment corresponding to the ratio of the program data viewing time and the CM data viewing time to the viewers, demanding the payment determined with the type of the program data and the CM data viewed by the viewer, and demanding the payment determined with the type and amount of the program data and the CM data viewed by the viewer, can be realized easily.

Note that, the AV data transmitting apparatus of the present invention is not limited to the first to fourth embodiments. Various modifications are possible.

For example, in the present embodiment, a Magnetic tape on which the program data scheduled to be transmitted was reproduced from by a VTR apparatus and the program data was read and fetched into an AV data transmitting apparatus. However, it is also possible to reproduce the data from other recording media or to directly supply the program data from for example a video library of a large capacity.

Further, the method of encoding the video data in the image encoder is not limited to the MPEG2 method and may be any method. Further, where program data which has been already compressed is supplied to the program data transmitting apparatus, even a configuration in which the image encoder is substantially omitted can be adopted.

Further, in the AV data transmitting apparatus 100a shown in FIG. 2, program data of a plurality of channels were multiplexed and transmitted, but it is also possible to transmit them by completely independent systems. Namely, the signal format at actual transmission may be any format. Further, the configuration of the receiving unit 202 of the AV data receiving apparatus 200a shown in FIG. 4 can be freely changed in accordance with the transmission signal.

Further, the communication between the AV data transmitting apparatus 100 and the AV data receiving apparatus 200 is not limited the telephone line. The radio system and the satellite communication system can be used.

According to the AV data transmitting apparatus and AV data receiving apparatus of the present invention and the broadcasting system constituted by them, it becomes possible to view a desired program in a form in accordance with the requirement of the viewer in a state with CMs appropriately inserted.

What is claimed is:

1. A video data receiving apparatus, comprising:
receiving means for receiving program data representing a program video and commercial data representing a commercial video;
input means for inputting insertion condition data instructing an insertion timing indicating a timing at which said commercial data is inserted into said program data;
display means for displaying said program video and/or said commercial video; and
insertion means for inserting said commercial data into said program data in accordance with said insertion condition data instructing said insertion timing inputted by said input means and providing the resulting data to said display means for display by said display means.

2. A video data receiving apparatus as set forth in claim 1, wherein
said insertion condition data indicates a number of times that said commercial video is inserted into said program data and a time period for display of each inserted commercial video.

3. A video data receiving apparatus as set forth in claim 1, wherein
said insertion condition data indicates that said commercial data is inserted in said program data at equal time intervals or unequal time intervals.

4. A video data receiving apparatus as set forth in claim 1, wherein:
said receiving means receives said commercial data including a plurality of types of commercial video;
said input means inputs selecting data to select desired commercial video from among said plurality of types of commercial video; and
said insertion means inserts said commercial data indicated in said selecting data into said program data and provides the data to said displaying means for display.

5. A video data receiving apparatus as set forth in claim 1, further comprising:
output means for outputting said insertion condition data instructing said insertion timing inputted by said input means according to a communication time for communicating said program video and/or said commercial video.

6. A video data receiving apparatus as set forth in claim 1, wherein said insertion timing indicates the rate of insertion of said commercial video to be inserted into said program video.

7. A video data receiving apparatus as set forth in claim 1, wherein said insertion timing indicates the number of commercials to be displayed during said program video.

8. A video data receiving apparatus as set forth in claim 1, wherein said insertion timing indicates that no commercials are to be inserted into said program video such that said program video is displayed continuously and not interrupted by commercials.

9. A video data receiving apparatus as set forth in claim 1, further comprising selecting means operable by a user to select said insertion condition data instructing said insertion timing.

10. A video data receiving apparatus, comprising:
receiving means for receiving program data to display program video and commercial data to display commercial video;
input means for inputting insertion condition data instructing insertion timing and/or insertion quantity of said commercial data inserted into said program data;
display means for displaying said program video and/or said commercial video; and
insertion means for inserting said commercial data into said program data based on said insertion condition data instructing said insertion timing and/or said insertion quantity inputted by said input means and providing the data to said display means;
wherein said input means inputs first data indicating that said program data is discarded during the time said commercial data is inserted and second data indicating that an output timing of said program data is delayed during the time said commercial data is inserted selectively; and
wherein said insertion means, when said first data is inputted by said input means, discards said program data during the time corresponding to the time said commercial data is inserted and inserts said commercial data into said program data, and when said second data is inputted by said input means, delays the output timing of said program data during the time corresponding to the time said commercial data is inserted and inserts said commercial data into said program data.

11. A video data transmitting apparatus, comprising:
multiplexing means for multiplexing program data representing a program video and commercial data representing a commercial video in a manner so that said program data and said commercial data can be demultiplexed and so that said commercial data can be inserted into said program data based on insertion condition data instructing an insertion timing indicating a timing at which said commercial data is to be inserted into said program data at a receiving side; and
transmitting means for transmitting said program data and said commercial data multiplexed by said multiplexing means and said insertion condition data to said receiving side.

12. A video data transmitting apparatus as set forth in claim 11, wherein said multiplexing means multiplexes said program data and said commercial data such that said program data is arranged after said commercial data.

13. A video data transmitting apparatus as set forth in claim 11, wherein said multiplexing means multiplexes said program data and said commercial data such that said commercial data is arranged in a vertical synchronization period of said program data.

14. A video data transmitting apparatus as set forth in claim 11, wherein said multiplexing means multiplexes on the same channel commercial data for first channel data containing said program data transmitted by said transmitting means on a first channel and commercial data for second channel data containing program data transmitted by said transmitting means on a second channel wherein said commercial data of said first and second channels is arranged in said same channel at positions in which the commercial data appears on a predetermined cycle of the respective first and second channels.

15. A video data transmitting apparatus as set forth in claim 11, wherein said insertion timing indicates the rate of insertion of said commercial video to be inserted into said program video.

16. A video data transmitting apparatus as set forth in claim 11, wherein said insertion timing indicates the number of commercials to be displayed during said program video.

17. A video data transmitting apparatus as set forth in claim 11, wherein said insertion timing indicates that no commercials are to be inserted into said program video such that said program video is displayed continuously and not interrupted by commercials.

18. A video data transmitting apparatus as set forth in claim 11, wherein said insertion condition data instructing said insertion timing is selected by a user at the receiving side.

19. A broadcasting system comprising:
  multiplexing means for multiplexing program data representing a program video and commercial data representing a commercial video;
  transmitting means for transmitting said program data and said commercial data multiplexed by said multiplexing means;
  receiving means for receiving said program data and said commercial data transmitted by said transmitting means;
  input means for inputting insertion condition data instructing an insertion timing indicating a timing for inserting said commercial data into said program data;
  output means for outputting to a communication line said insertion condition data instructing said insertion timing inputted by said input means;
  display means for displaying said program video and/or said commercial video received by said receiving means;
  insertion means for inserting said commercial data into said program data based on said insertion condition data instructing said insertion timing inputted by said input means and providing the data to said display means;
  wherein said receiving means receives from said communication line said insertion condition data output by said output means; and
  storing means for storing said insertion condition data received by said receiving means.

20. A video data transmitting apparatus, comprising:
  multiplexing means for multiplexing program data representing a program video and commercial data representing a commercial video based on insertion condition data instructing insertion timing indicating a timing for inserting said commercial data into said program data, said insertion condition data being transmitted to a receiving side; and
  transmitting means for transmitting said program data and said commercial data multiplexed by said multiplexing means to said receiving side.

21. A video data transmitting apparatus as set forth in claim 20, wherein said insertion timing indicates the rate of insertion of said commercial video to be inserted into said program video.

22. A video data transmitting apparatus as set forth in claim 20, wherein said insertion timing indicates the number of commercials to be displayed during said program video.

23. A video data transmitting apparatus as set forth in claim 20, wherein said insertion timing indicates that no commercials are to be inserted into said program video such that said program video is displayed continuously and not interrupted by commercials.

24. A video data transmitting apparatus as set forth in claim 20, wherein said insertion condition data instructing said insertion timing is selected by a user at the receiving side.

\* \* \* \* \*